United States Patent [19]

Arai

[11] Patent Number: 4,924,031
[45] Date of Patent: May 8, 1990

[54] WATER-TIGHT STRUCTURE FOR MULTICORE CABLE

[75] Inventor: Takatoshi Arai, Saitama, Japan

[73] Assignee: Jidosha Kiki Co., Ltd., Tokyo, Japan

[21] Appl. No.: 285,067

[22] Filed: Dec. 15, 1988

[30] Foreign Application Priority Data

Dec. 24, 1987 [JP] Japan .................... 62-194956[U]

[51] Int. Cl.$^5$ .................... H01B 17/30; F04B 17/04
[52] U.S. Cl. .................... 174/52.3; 174/23 R; 174/152 R; 417/417
[58] Field of Search .................... 174/18, 23 R, 52.3, 174/151, 152 R

[56] References Cited

U.S. PATENT DOCUMENTS

| | | | |
|---|---|---|---|
| 658,192 | 9/1900 | Sutter | 174/23 R X |
| 1,267,832 | 5/1918 | Wilkinson | 174/23 R |
| 2,624,286 | 1/1953 | Smith | 174/23 R |
| 2,890,268 | 6/1959 | Berry | 174/23 R X |
| 2,898,396 | 8/1959 | Watson | 174/23 R X |
| 3,839,596 | 10/1974 | Glover | 174/23 R X |
| 4,299,544 | 11/1981 | Masaka | 417/417 |
| 4,306,842 | 12/1981 | Masaka | 417/417 |
| 4,643,653 | 2/1987 | Masaka et al. | 417/417 |

FOREIGN PATENT DOCUMENTS 59-12182   1/1984   Japan .

Primary Examiner—Laramie E. Askin
Attorney, Agent, or Firm—Blakely, Sokoloff, Taylor & Zafman

[57] ABSTRACT

A water-tight structure for a multicore cable includes a sealed vessel in which electrical components are arranged, and a grommet having an insertion hole disposed at a multicore cable lead portion of the sealed vessel. The multicore cable is held in the insertion hole of the grommet and has a solder-dipped portion in the grommet which has been bent, a portion of the solder-dipped portion being covered with a metal sleeve.

1 Claim, 4 Drawing Sheets

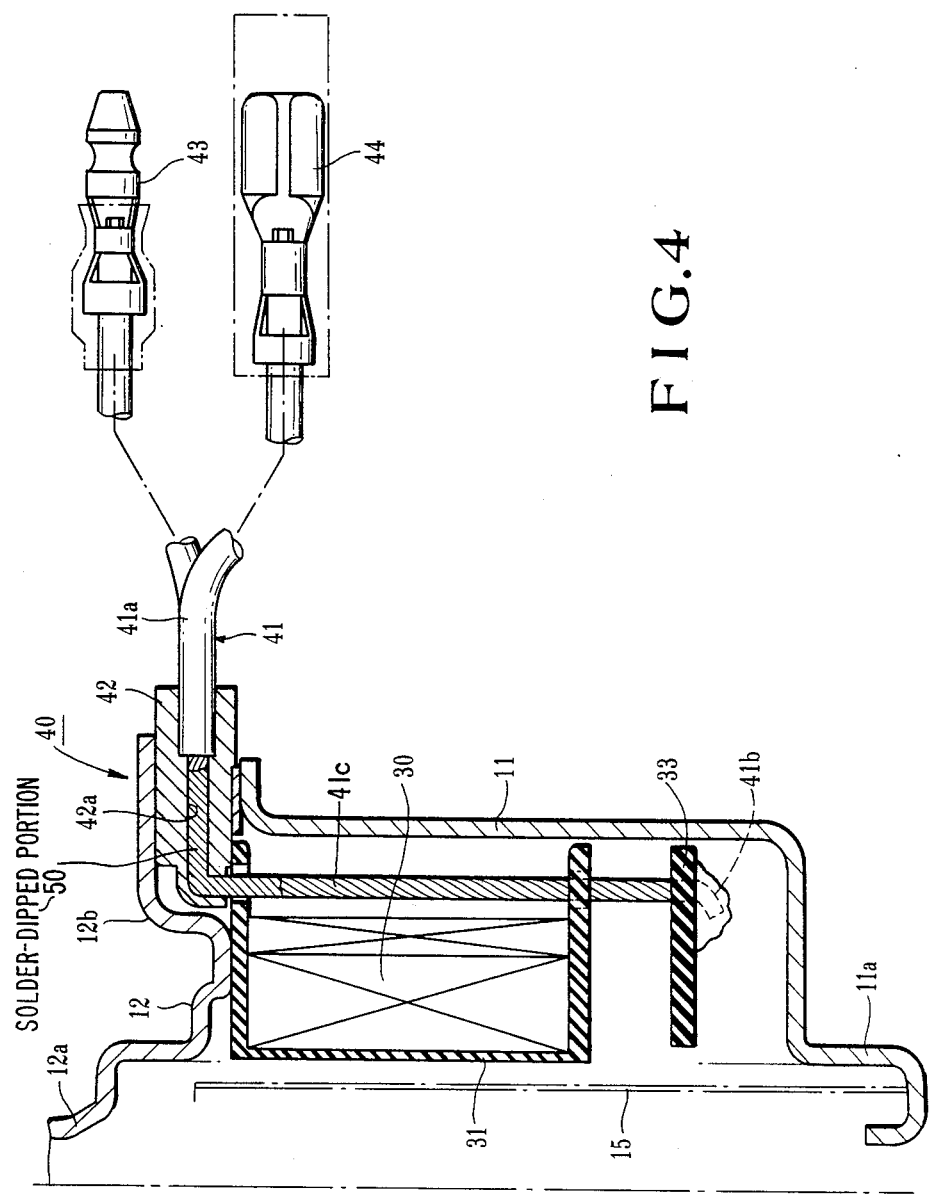

WATER-TIGHT STRUCTURE FOR MULTICORE CABLE

BACKGROUND OF THE INVENTION

The present invention relates to an improvement of a water-tight structure for a multicore cable suitably used in, e.g., an electromagnetic pump used for supplying fuel to a vehicle.

An electromagnetic pump used as a vehicle fuel supply pump or the like is often mounted outside the vehicle, particularly, under the floor. The electromagnetic pump tends to be contaminated with water or dirt during vehicle travel. Therefore, a pump housing constituting an outer casing of the pump requires a waterproof joint and the like. This requirement is apparent because an electrical chamber having an excitation coil, a transistor, a printed circuit board, and the like therein is defined in the pump housing.

For this reason, in a conventional electromagnetic pump of this type, a pump housing which accommodates the electrical components described above is constituted by a sealed vessel to assure waterproofness. In this case, a problem is posed at a cable lead portion for connecting electrical components to external devices. More specifically, cables for externally connecting the electrical components arranged in the electrical chamber are led from a cable lead portion arranged at part of the pump housing through a grommet or the like. The grommet can relatively easily achieve waterproofness between housing holes and the cable covering. However, water or moisture inevitably enters into the pump housing at the cable lead portion through the inside of the cable covering. In the cable, inner conductor ends which have the insulation stripped therefrom inside the pump housing are exposed in the electrical chamber, while outer ends of the stripped conductors are connected to terminals of external equipment or connectors. A conductive state is assured through the conductive portions in the stripped portions. An internal pressure of the electrical chamber tends to be changed due to changes in temperature. The internal pressure may serve as a negative pressure with respect to the external pressure. In this case, it is readily understood that water or moisture is drawn into the electrical chamber through the interior portions of the conductors.

In this case, if the cable comprises a single core wire, a critical problem does not occur. However, a single core cable cannot assure the mechanical strength for use as a cable, such as a cable for a vehicle fuel pump, which is subjected to vibrations and bending. Therefore, a multicore cable obtained by twisting a plurality of thin wires is generally used because it has flexibility and tends to be easily bent. In such a multicore cable, however, the shape of a space between thin wires and the shape at an outer portion of the cable form an in-flow path. As a result, such a multicore cable cannot provide a good seal.

The electromagnetic pump described above employs a cable described in U.S. Pat. No. 4,299,544. In this cable, a foamed synthetic resin material is filled or applied to the electrical chamber from which the cable extends. Inner conductor end portions of the cable which are stripped of insulation inside the electrical chamber are sealed with the resin material, and water, salt water, and moisture which tend to enter into the stripped inner end cable portion inside the electrical chamber are shielded, thus constituting a general sealing structure.

According to the conventional sealing structure, however, the resin material filled or applied to the inside of the pump housing has low heat resistance and has poor wettability with an oil. In addition, during filling or application of this resin material, strict conditions such as conditions for contamination of the seal surfaces, a filling amount, an application amount, a dry time, and air accumulation, are required, and sealing properties undesirably vary, thus failing to satisfy sealing reliability. In addition, when such a resin material is utilized, the working processes are complicated to result in cumbersome operations. Moreover, the resin may leak outside the housing to contaminate the outer surface of the housing. The leaking resin component must be removed. Therefore, strong demand has arisen for another sealing countermeasure.

A connecting component such as a hermetic seal may be used at the cable lead portion for leading a cable from the pump housing to perfectly seal the electrical chamber. With this arrangement, the number of components constituting the cable lead portion is increased, and the assembly operation is also complicated. In addition, thermal expansion coefficients of the components must be matched at the cable lead portion, resulting in high cost. In particular, a terminal structure by such a hermetic seal tends to be damaged by a thermal effect or impact and tends to be cracked by vibrations. A component for reinforcing the terminal structure is thus required. As a result, the number of components is further increased, and an increase in cost is unavoidable.

Still another conventional technique is also proposed. A compression force of rubber or the like is utilized to assure water-tightness between the pump housing and the cable covering at the cable lead portion. The outer ends of the extended cable are connected with waterproof connectors or the like so as to assure water-tightness. Entrance of moisture or the like through the inside of the cable can thus be prevented by the waterproof connector. However, such a waterproof connector requires a larger number of components, and its structure is complicated. In addition, complicated assembly is required which results in high cost, thus posing many practical problems. Strong demand has arisen to solve all these problems.

SUMMARY OF THE INVENTION

It is an object of the present invention to provide a simple, low-cost water-tight structure for a multicore cable which can satisfactorily prevent entrance of water, salt water, and moisture into a sealed vessel.

It is another object of the present invention to provide a water-tight structure for a multicore cable which does not require an increase in the number of components.

It is still another object of the present invention to provide a water-tight structure for a multicore cable which can facilitate assembly.

In order to achieve the above objects of the present invention, there is provided a water-tight structure for a multicore cable, comprising: a sealed vessel in which electrical components are arranged; and a grommet having an insertion hole disposed at a multicore cable lead portion of the sealed vessel, wherein the multicore cable is held in the insertion hole of the grommet and has a solder-dipped portion in the grommet which has been bent, a portion of the solder-dipped portion being covered with a metal sleeve.

A covering of the multicore cable extending from a sealed vessel through a grommet is stripped of insulation, and the stripped portion is dipped in a solder layer to integrate a plurality of thin twisted wires with solder. The cable is set at the cable lead portion while the solder-dipped portion is inserted in a grommet throughhole, thereby preventing entrance of moisture through the inside of the cable covering.

BRIEF DESCRIPTION OF THE DRAWINGS

FIG. 4 is an enlarged sectional view showing a main part of a water-tight structure for a multicore cable according to another embodiment of the present invention.

DESCRIPTION OF THE PREFERRED EMBODIMENTS

Preferred embodiments of the present invention will be described with reference to the accompanying drawings.

Figure 1:
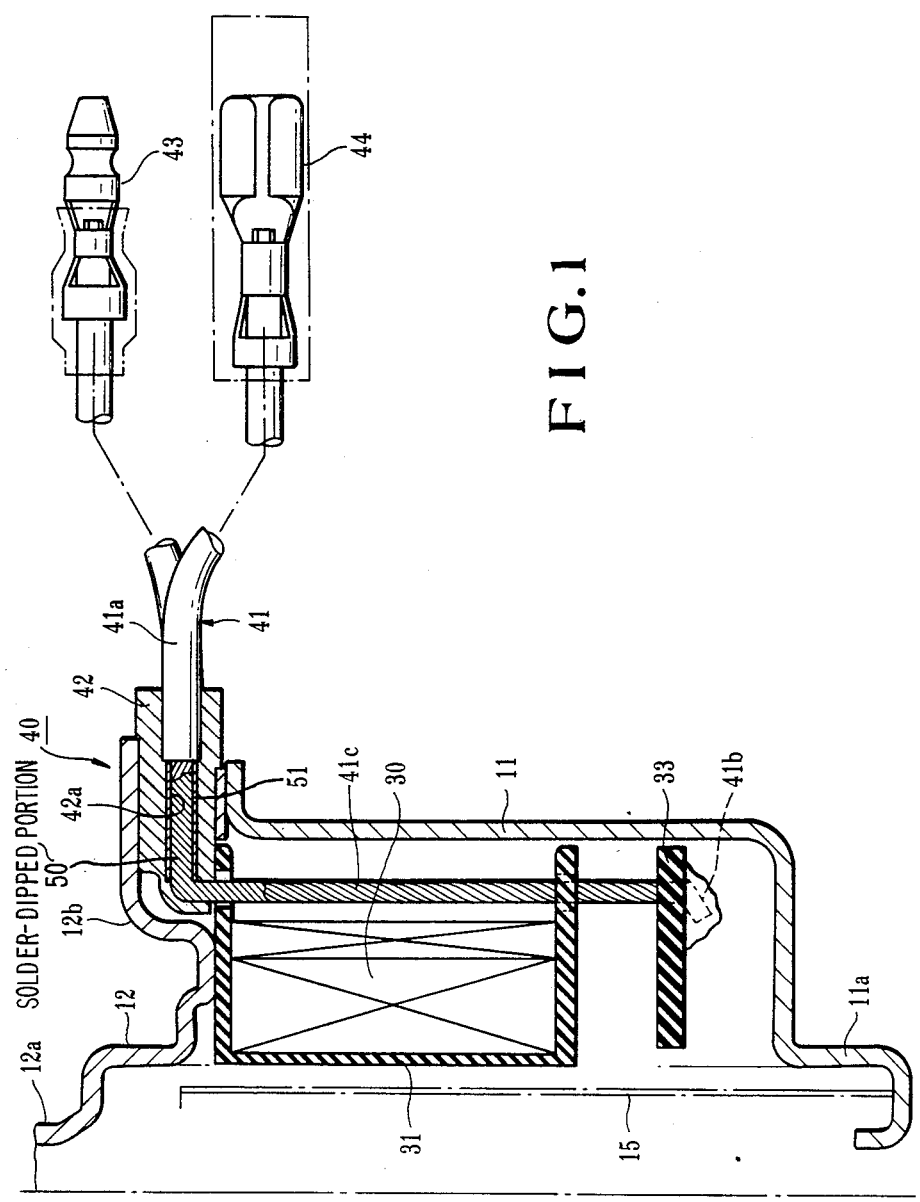
FIG. 1 is an enlarged sectional view showing a main part of a water-tight structure for a multicore cable used in an electromagnetic pump according to an embodiment of the present invention.
Figure 2A:
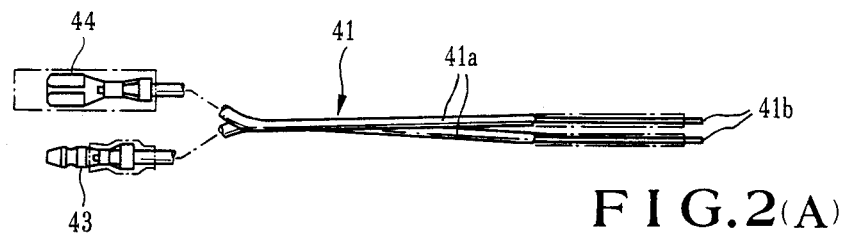
FIGS. 2A to 2F are schematic views for explaining steps in processing the multicore cable according to the present invention.
Figure 2B:
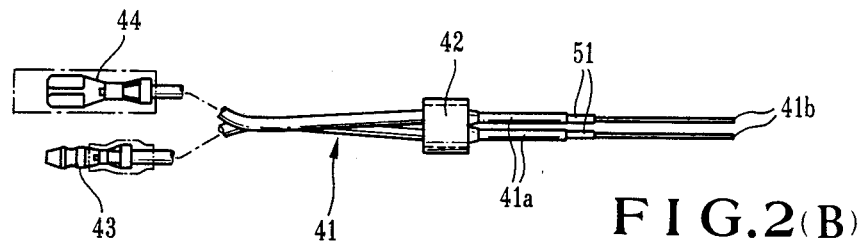
Figure 2C:
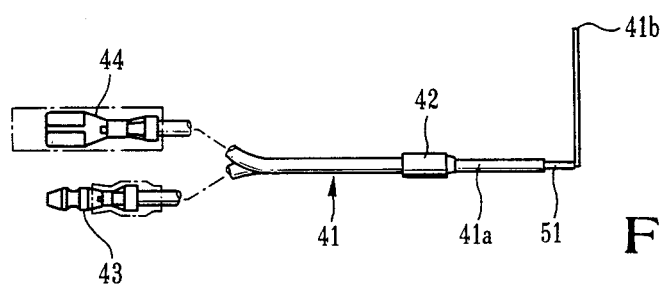
Figures 2D, 2E:
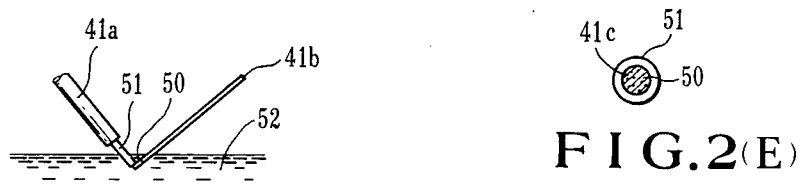
Figure 2F:
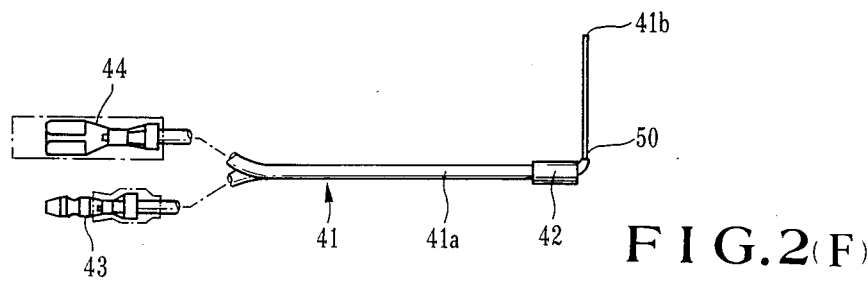
Figure 3:
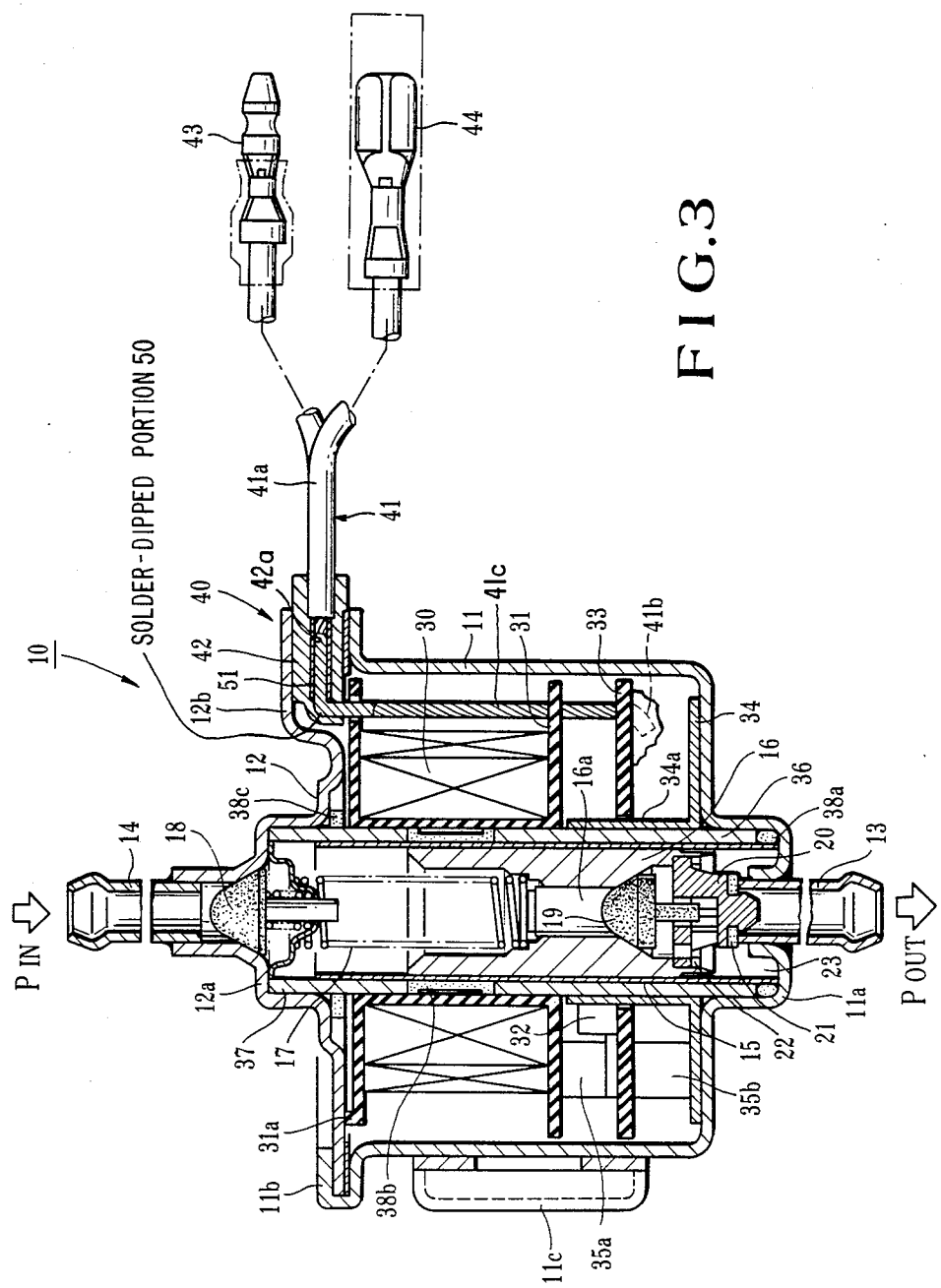
FIG. 3 is a longitudinal side sectional view showing an overall structure of the electromagnetic pump which employs the present invention.

FIGS. 1 to 3 show an embodiment in which a water-tight structure for a multicore cable according to the present invention is applied to a vehicle fuel supply electromagnetic pump. A structure of an electromagnetic pump 10 will be briefly described with reference to FIG. 3. Reference numeral 11 denotes a cup-like housing body constituting a pump housing serving as a sealed vessel. Reference numeral 12 denotes a disk-like lid for closing an opening end of the cup-like housing body 11. Cylindrical portions 11a and 12a which extend outwardly are integrally formed at the central bottom portion of the body 11 and the central portion of the lid 12, respectively. Pipes 13 and 14 which serve as outlet and inlet ports are brazed at the centers of the cylindrical portions 11a and 12a, respectively. The body 11 and the lid 12 can be easily prepared by pressing a metal plate. An opening edge 11b of the body 11 is crimped over the edge of the lid 12 to constitute a single vessel. The housing body 11 and the lid 12 also serve as a yoke for forming a magnetic flux path from an excitation coil (to be described later). An internal space defined by the body 11 and the lid 12 is used to accommodate mechanical and electrical components of the pump. Reference numeral 11c denotes a mounting bracket for fixing the pump 10 to a mounting portion such as a vehicle body.

Reference numeral 15 denotes a nonmagnetic sleeve member interposed between the cylindrical portions 11a and 12a of the body 11 and the lid 12. A magnetic plunger 16 having a through hole 16a is slidably fitted inside the nonmagnetic sleeve member 15. In a normal state, the magnetic plunger 16 is urged toward the outlet port by a biasing force of a return spring 17 at the inlet port side. Reference numeral 18 denotes a suction valve arranged near the inlet end of the sleeve member 15. Reference numeral 19 denotes a delivery valve arranged near the outlet end of the plunger 16. A valve body constituting the delivery valve 19 is slidably supported in a central cylindrical portion of a ring-like member 20 constituting a control valve for preventing fluid leakage. In this case, the control valve is integrally fixed to the outlet end of the plunger 16. The ring-like member 20 also serves as a guide for guiding the valve body of the delivery valve 19. A valve seat 21 made of a rubber or synthetic resin material is mounted at the distal end portion of the cylindrical portion on the fluid outlet port. The valve seat 21 has a predetermined length within the end portion of the sleeve member 15 on the fluid outlet port side and serves to open/close the inner end of the fluid outlet port pipe 13. Reference numeral 22 denotes a stopper ring for fixing the ring-like member 20 at the end of the plunger 16. Holes are formed in the ring-like member 20 to cause the fluid to flow therethrough as needed. The fluid leakage preventing control valve is moved in the sleeve member 15 upon movement of the plunger 16. In the deenergization state, the sleeve member 15 closes the inner end of the pipe 13 by an action of the return spring 17, thereby preventing the fluid from leaking toward the outlet port. In this embodiment, in order to constitute the control valve described above, the inner end of the pipe 13 of the outlet side is extended into the sleeve member 15 for a predetermined length, and an annular space 23 serving as a pulsation absorption chamber is formed around the extended portion.

A resin coil bobbin 31 around which an excitation coil 30 is wound is mounted around the sleeve member 15 which receives the plunger 16 therein. A transistor 32 and the like which constitute an oscillator for supplying an intermittent current to the excitation coil 30 are arranged on the outer surface portion of one (lower) flange at a predetermined interval therefrom. A printed circuit board 33 having various electronic components (not shown) such as a resistor and a diode which constitute the oscillator together with the transistor 32, and a holder 34 spaced apart from the circuit board 33 by a predetermined distance are arranged outside the transistor 32 and the like. The printed circuit board 33 and the holder 34 are sequentially stacked in a direction perpendicular to the surface of the printed circuit board 33. A laminated body of the pump components is housed in the body 11 such that the holder 34 is located at the distal end of the housing body 11 while the laminated body is elastically supported by elastic projections 31a extending upright at equal angular intervals on the peripheral portion of the other (upper) flange of the coil bobbin 31 located on the opening end side of the body 11. Therefore, the laminated body is sandwiched between the body 11 and the lid 12. Reference numerals 35a and 35b denote studs extending on the surface (i.e., the outer surface of the one flange) of the bobbin 31 and the inner surface of the holder 34 to hold the bobbin 31, the printed circuit board 33, and the holder 34 at predetermined intervals. Reference numeral 34a denotes a cylindrical portion formed at the central portion of the holder 34 to hold the sleeve member 15. The printed circuit board 33 and the holder 34 constitute the ring-like member together with the bobbin 31.

According to the electromagnetic pump 10, the pump housing comprises the cup-like body 11 and the lid 12 for closing the opening end of the cup-like body 11. The pump components are stacked and accommodated in the space defined by the body 11 and the lid 12. The structure and working of the components can be simplified, and assembly can also be facilitated. Rotation of the laminated body such as the bobbin 31 accommodated within the housing can be stopped by utilizing a frictional force between the members, or by an engaging portion between the bobbin 31 and the lid 12.

Reference numerals 36 and 37 denote magnetic cylinders inserted between the outer circumferential surface of the sleeve member 15 containing the plunger 16 therein and the inner wall surface of the bobbin 31 from both ends. The magnetic cylinders 36 and 37 are used to reciprocate the plunger 16 by an excitation force of the coil 30. When the magnetic cylinders 36 and 37 comprise ring or split bushes obtained by bending a plate material, working can be simplified. Reference numerals 38a, 38b, and 38c denote seal members for sealing a space between the interior of the sleeve member 15 and the internal space of the pump housing.

With the electromagnetic pump 10 having the construction described above, a bulged portion 12b which is open at part of the circumference is formed in at least one of the opening edge 11b of the body 11 constituting the pump housing as the sealed vessel and the edge of the lid 12 (the edge of the lid 12 in this embodiment). A cable lead portion 40 is arranged between the bulged portion 12b and the edge (i.e., the opening edge 11b of the body 11) of the other member opposite to the bulged portion 12b. A grommet 42 for holding a cable (multicore cable) 41 comprising a plurality of conductors 41c led from the housing is compressed and held. Inner conductor 41b of the cable 41 from which coverings 41a are stripped are guided to the printed circuit board 33 located at bottom portion of the body 11 and are held by the flanges of the bobbin 31, and are fixed to part of the printed circuit board 33 by soldering or the like. In this manner, the inner conductor ends 41b are electrically connected to an internal component. An outer end of the cable 41 is connected to normal (+ and −) connectors 43 and 44 while the covering is stripped from the outer end. Therefore, the outer end is connected to an external device.

In the electromagnetic pump 10 having the above construction according to the characteristic feature of the present invention, a portion (which is held in a grommet insertion hole 42a) of the multicore cable 41 led out from the cable lead portion 40 of the pump housing serving as the sealed vessel through the grommet 42 is constituted by a solder-dipped portion 50.

More specifically, in the cable lead portion 40 from the housing in the electromagnetic pump 10, the following drawback caused by a multicore conductor, i.e., a strand obtained by twisting a plurality of thin wires 41c, can be solved. That is, when the cable 41 comprises a stranded cable, the shape between the thin wires and the shape at the outer portion form a flow-in path in the space between the conductors or in the space between the conductor portions and the coverings 41a or the grommet insertion hole 42a to allow communication between the external atmosphere and the electrical chamber inside the housing. Water, salt water, moisture, and the like can then enter into the electrical chamber due to a difference between the internal and external pressures of the pump to cause rusting or corrosion of the components in the electrical chamber. In order to solve this drawback, the strand portion held in the insertion hole 42a of the grommet 42 is dipped in a solder tank 52 (FIG. 2D), so that the spaces and projections on the outer surfaces of the strands, which may constitute flow-in paths as described above, can be eliminated by embedding the solder into the spaces or covering the projections with the solder. When the solder-dipped portion 50 is inserted into and held in the grommet insertion hole 42a, the flow-in paths which are undesirably formed in the conventional case can be eliminated, thus readily demonstrating the advantage of the present invention.

In this embodiment, grommet 42 held portions of the cable 41 are bent at a right angle and are guided into the housing. Metal (brass) sleeves 51 are fitted in the grommet 42 to protect the bent portions. In this embodiment, in order to enhance a water-tight effect by the solder-dipped portions 50, at least parts of the portions 50 are respectively inserted into the metal sleeves 51, and the opening end portions are also bonded to the cable 41 by soldering or the like. However, the metal sleeves 51 need not be used. As shown in FIG. 4, it is apparent that the solder-dipped portion may be directly inserted into the grommet insertion hole 42a to obtain a water-tightness by elasticity of the grommet 42. In this case, the solder-dipped portions 50 held in the grommet 42 are preferably formed as long as possible.

In order to form the solder-dipped portion 50 of the cable 41, the steps shown in FIGS. 2A to 2F can be performed. More specifically, the coverings of the conductor ends 41b of the cable 41 are partially removed, as indicated by the imaginary lines in FIG. 2A. The exposed conductor portions are soldered, and the coverings of the portions to be held in the grommet 42 are removed, as indicated by the solid lines in FIG. 2A. The grommet 42 and the metal sleeves 51 are fitted on the cable from the internal conductor ends 41b, as shown in FIG. 2B. The multicore conductors are bent at the inner ends of the metal sleeves 51, as shown in FIG. 2C. Thereafter, the cable including the bent portions and the inner end portions of the metal sleeves 51 are dipped in the solder tank 52, as shown in FIG. 2D. Soldering is performed such that no space is formed between the metal sleeves and the inner conductor wires 41c, as indicated by the cross section in FIG. 2E. Thereafter, the grommet 42 is fitted on the metal sleeves 51, as shown in FIG. 2F, thereby obtaining the cable lead portion 40.

With the above construction, the cable 41 need not be cut at an intermediate position, and a countermeasure for increasing the mechanical strength need not be taken. The water-tight structure of the cable lead portion 40 can be easily obtained. In addition, the number of required components is small, and working can be simplified, thus providing many practical advantages.

The present invention is not limited to the particular embodiment described above. The shape and structure of the pump components can be arbitrarily changed and modified. In the above embodiment, the metal sleeves 51 are used to assure good sealing property through the multicore wire portions of the cable 41. However, the metal sleeves 51 are not limited to simple sleeves, but can be constituted by ring-like members each with a slit. In this case, the slit portion is soldered by a required length. This soldering operation can be simultaneously performed during dipping of the necessary parts of the cable 41 in the solder tank, thus resulting in convenience. The metal sleeve 51 may be replaced with an eyelet or grommet. In addition, the metal sleeves 51 may be omitted, as described above.

The solder-dipped portions 50 of the cable 41 are not limited to the positions corresponding to the inlet portion of the sealed vessel as in the above embodiment. Exposed portions from which the coverings 41a are removed at the connectors 43 and 44 may be sealed together with the covered end portions by proper auxiliary members.

The above embodiment exemplifies the electromagnetic pump. However, the present invention is not limited to this, but can be properly applied to any cable lead portion if it requires this kind of water-tight structure.

In the water-tight structure for a multicore cable according to the present invention as has been described above, the portion of the multicore cable led from the cable lead portion of the sealed vessel containing electrical components therein through the grommet is constituted by the solder-dipped portion. Entrance of water, salt water, moisture, and the like into the sealed vessel through the inside of the covering of the cable can be perfectly prevented with a simple construction at low cost. In order to perform the water-tight process, the number of components is not increased. An exposed portion of the multicore cable is dipped in the solder tank, thus improving assembly efficiency and providing many advantages as compared with the conventional techniques. The multicore cable includes a strand obtained by winding a plurality of covered wires.

What is claimed is:

1. A multicore cable and a water-tight structure comprising;
   a sealed vessel in which electrical components are arranged;
   a grommet having an insertion hole disposed at a multicore cable lead portion of said sealed vessel;
   wherein the multicore cable is held in the insertion hole of said grommet, includes a covering and an internal conductor, and has a solder-dipped portion which has been bent disposed within said grommet;
   wherein a portion of the solder-dipped portion is covered with a metal sleeve having first and second open end portions; and
   wherein the portion of the multicore cable which is covered with said metal sleeve is a portion from which said covering has been removed, and said open first and second end portions of said metal sleeve are bonded to said internal conductor by a solder layer.

* * * * *